Figure 1:
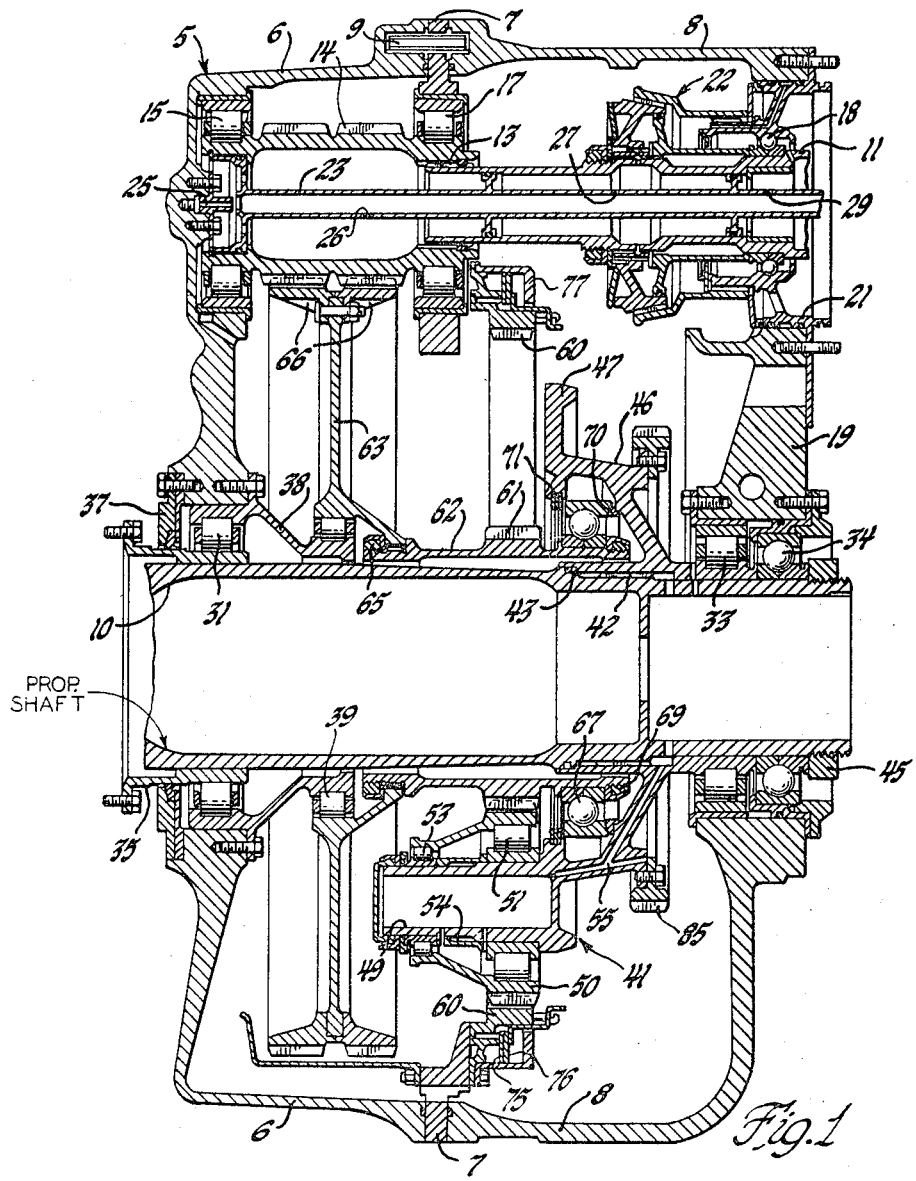

Jan. 21, 1969  C. M. HAWKINS ET AL  3,422,703
TORQUE-RESPONSIVE DEVICE
Filed Sept. 15, 1966

INVENTORS
Cyril M. Hawkins &
BY Truman R. Richardson
Paul Fitzpatrick
ATTORNEY ed in the rear wall within a support 21 which also supports a propeller brake 22. An oil tube 23 supported in the front hub of pinion 14 and in shaft 11 receives oil through its open front end from oil jet 25 and discharges it through lateral openings such as 26, 27, and 29 to lubricate the splines, propeller brake, and bearing 18.

The propeller shaft 10 is mounted in axially-free radial bearings 31 in the forward wall of the case and 33 in the rear wall 19. It is also located axially by a ball thrust bearing 34 fixed in the rear wall. The inner race of bearing 31 is provided by a ring 35 forming part of the propeller shaft. A ring 37 retains a seal at the forward side of bearing 31. The outer race of bearing 31 is defined by a more or less conical ring 38 bolted to the forward wall which also defines the inner race of a roller bearing 39. A planet carrier 41 is piloted on the rear end of the propeller shaft, splined to it at 42, and bearing against a shoulder 43. The inner race of bearing 33 abuts the hub of the planet carrier and the inner race of thrust bearing 34 abuts that of bearing 33. When the propeller shaft is installed, the nut 45 retains these parts assembled on the propeller shaft and transmits the normal forward thrust of the propeller to the thrust bearing. Rearward thrust of the propeller, which may occur, will be transmitted from shoulder 43 to the thrust bearing.

The planet carrier 41 comprises a more or less conical disk 46 and a radial flange 47 from which extend seven trunnions 49, each mounting a planet gear 50. These planet gears have conical hubs or shafts which define the outer races of a main roller bearing 51 and a lesser roller bearing 53 which support the planet gear rotatably on the trunnion. The trunnion and a spacer 54 between the bearing inner races have passages for oil to flow to these bearings, this oil being supplied from within the propeller shaft through passages 55 in the planet carrier.

The planet gears 50 mesh with a nonrotating ring gear 60 and with a sun gear 61 which is integral with a shaft 62. The forward end of shaft 62 is splined to the hub of a bull gear assembly 63 which is retained by a nut 65. The bull gear comprises a disk and two gear rings 66 bolted to the rim of the disk. The hub of the bull gear rolls on axially-free bearing 39, thus providing a support for the forward end of shaft 62. The rear end of shaft 62 is mounted in a ball thrust bearing 67 which is retained on the rear end of the shaft by a nut 69. The outer race of bearing 67 abuts a conical thrust washer 70 which in turn is seated on a ridge on the forward face of the planet carrier. The normal thrust of the sun gear, resulting from the pitch of the helical teeth, is rearward, opposing the propeller thrust. Rings 71 mounted in an annular recess in the planet carrier may serve as vibration dampers or as a forward abutment for the outer race of bearing 67 in the event of reversal of torque and, therefore, gear thrust.

Figure 2:
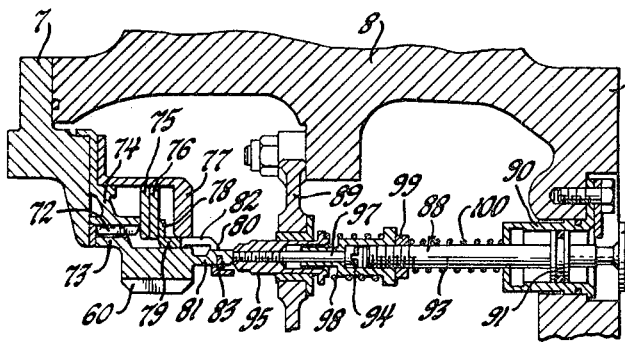

The ring gear 60 is mounted on the center plate 7 with freedom for limited axial movement by structure shown most clearly in FIGURE 2. Helical splines 72 on a flange 73 of the ring gear engage helical splines on the interior of a mounting ring 74 fixed to the center plate 7. A pair of oppositely inclined Belleville springs 75 and 76 are mounted within an annular retainer 77 so that the inner margin of spring 75 is adapted to bear against the splined mounting ring 74 or the flange 73. The outer margins of the two springs bear against each other, and the inner margin of spring 76 bears against flange 78 of an actuating ring 79 which has a second flange 80. Fingers 81 extend from the ring gear 60 through slots 82 in the actuating ring. A split ring 83 mounted in an internal circumferential groove in the fingers 81 may bear against the radial face 80 of ring 79. Under no torque conditions, springs 75 and 76 deflect apart at their inner margins, pushing actuating ring 79 to the right, as shown in the drawings, until its flange 78 bears against the ring 77. The actuating ring 79 thus biases the ring gear to the right or rearwardly from the position shown until the flange 73 of the ring gear abuts the inner margin of spring 75. This may be considered the neutral or low-torque position of the ring gear. However, the pitch of the planetary gears and of splines 72 are such that the normal driving torque biases the ring gear forwardly and is sufficient to collapse the Belleville springs 75 and 76 so that the normal operating position of the ring gear is as shown.

The foregoing should constitute a sufficient description of the reduction gear for the purposes of this application.

Reverse torque may shift the ring gear rearwardly from its neutral position, also collapsing the Belleville springs. Thus, the ring gear has three axial positions, one representing the normal condition of engine operation condition above a predetermined power output, an intermediate or neutral position, representing a lower power output, and a third position representing power input from the propeller to the engine above a certain level. Such movements of the ring gear are transmitted by a plunger assembly 88 (FIG. 2) slidably mounted in a support 89 bolted to the case and in a bushing 90 fixed to the rear wall 19 of the case. The plunger 88 includes a flange 91 which slides within the bushing 90 and bears a peripheral seal. A flange 92 at the outer end of the plunger 88 may be connected to a suitable actuated device and corresponds in function to the push rod 64 of U.S. Patent 2,959,228. Plunger assembly 88 comprises an outer member 93, an intermediate member 94, and a follower 95. The follower 95 bears against the portion 81 of the ring gear. It is slidably connected to the intermediate member 94 by means of a bolt 97 and an overtravel spring 98. The relation of parts 94 and 95 is normally constant, but the follower 95 can move rearwardly in the case of overtravel of the ring gear with respect to the actuated control. The intermediate member 94 is connected to the outer member 93 by threads to provide a position adjustment, and is locked by jam nut 99. A spring 100 bearing against a flange of bushing 90 maintains the plunger assembly 88 in contact with the ring gear.

Reviewing the operation of this device, bear in mind that as shown in FIGURE 2 it is in the position representing normal engine output. If the torque decreases sufficiently, the Belleville springs will expand and push actuating ring 79 and ring gear 60 rearwardly until flange 78 of the actuating ring engages the retainer 77. This, of course, extends plunger 92 a perceptible distance to the rear. The parts remain in this position under lower torque conditions but, upon the occurrence of a predetermined reverse torque, the reverse torque biasing the ring gear rearwardly will act against the inner margin of spring 75 and again collapse the Belleville springs. In this action the ring gear moves further rearwardly, sliding on the mounting splines and on the interior of actuating ring 79. This displaces the plunger 88 to the third position indicating a predetermined reverse torque.

The structure of the torque responsive device has various advantages which should be mentioned. Some of these are the result of the characteristic of the Belleville spring, which has a zero rate. The result of this is that the control apparatus has small hysteresis or, in other words, the control points have a narrow spread. Another advantage of the large Belleville springs is that they are not highly stressed and do not require expensive materials or expensive heat treating such as would be necessary for small highly loaded springs. The Belleville springs, being approximately the diameter of the ring gear, are sufficiently large that unit stresses can be small and ample force can be generated to balance the high spline helix angle required to minimize friction effects.

The torque responsive structure has low effective friction due to the application of axial thrust generated in the helical gear teeth to assist the high helix angle spline teeth in the generation of an axial force. The three positions of the plunger 88 are definitely established by positive stops and the movement from one position to another is essentially a snap action rather than slow or progressive. The simplicity, lightness, and compactness of the structure will, of course, be apparent from the drawings.

The description of the preferred embodiment of the invention for the purpose of explaining the principles thereof is not to be considered as limiting or restricting the invention, since many modifications may be made by the exercise of skill in the art.

We claim:
1. A reduction gear for a turboprop engine comprising, in combination,
 power transmitting gearing including a ring gear,
 means nonrotatably mounting the ring gear including axial splines on the ring gear,
 the relation of helix angles of the said splines and of the teeth on the ring gear being such that torque on the ring gear exerts an axial force on the gear,
 means defining an abutment spaced axially of the gear from the mounting means,
 spring means disposed between and bearing against the mounting means and the abutment,
 means on the ring gear engaging both ends of the spring means so that the spring means biases the ring gear axially to a neutral position, axial thrust of the gear in either direction above the spring force being effective to shift the ring gear in such direction from the neutral position,
 and control means actuated by such shifting of the ring gear.
2. A gear as recited in claim 1 in which the said splines are helical and the ring gear teeth are helical.
3. A gear as recited in claim 1 in which the spring means comprises a Belleville spring coaxial with the ring gear.
4. A gear as recited in claim 1 in which the spring means comprises Belleville springs in back-to-back oppositely inclined relation.
5. A gear as recited in claim 4 in which the Belleville springs are coaxial with the ring gear.

References Cited
UNITED STATES PATENTS

| | | | |
|---|---|---|---|
| 2,518,708 | 8/1950 | Moore | 74—410 |
| 3,385,136 | 5/1968 | Berry et al. | 74—801 |
| 2,353,814 | 7/1944 | De Pew | 74—801 XR |
| 2,825,247 | 3/1958 | Haworth et al. | 74—801 |
| 2,936,655 | 5/1960 | Peterson et al. | 74—410 XR |

DONLEY J. STOCKING, *Primary Examiner.*

L. H. GERIN, *Assistant Examiner.*

U.S. Cl. X.R.
73—117.4, 136